US006765902B1

(12) United States Patent
Nelson

(10) Patent No.: US 6,765,902 B1
(45) Date of Patent: Jul. 20, 2004

(54) METHOD AND APPARATUS FOR NETWORK-BASED TELEPHONE COMMUNICATION WITHOUT A SEPARATE CALL MANAGER UNIT

(75) Inventor: Mark R. Nelson, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/385,229

(22) Filed: Aug. 27, 1999

(51) Int. Cl.$^7$ .............................................. H04L 12/66
(52) U.S. Cl. ..................................................... 370/352
(58) Field of Search ................................ 370/352–356, 370/395.52, 419, 463, 260, 270, 271; 379/156, 162–165, 177, 182

(56) References Cited

U.S. PATENT DOCUMENTS

| | | |
|---|---|---|
| 4,313,036 A | 1/1982 | Jabara et al. |
| 4,764,919 A | 8/1988 | Hunter et al. |
| 4,903,261 A | 2/1990 | Baran et al. |
| 4,905,231 A | 2/1990 | Leung et al. |
| 5,093,827 A | 3/1992 | Franklin et al. |
| 5,195,086 A | 3/1993 | Baumgartner et al. |
| 5,235,595 A | 8/1993 | O'Dowd |
| 5,526,353 A | 6/1996 | Henley et al. |
| 5,550,906 A | 8/1996 | Chau et al. |
| 5,594,732 A | 1/1997 | Bell et al. |
| 5,659,542 A | 8/1997 | Bell et al. |
| 5,742,596 A | 4/1998 | Baratz et al. |
| 5,790,652 A * | 8/1998 | Gulley et al. ................ 379/368 |
| 5,822,682 A * | 10/1998 | Schroderus et al. ........ 455/63.3 |
| 5,838,683 A | 11/1998 | Corley et al. |
| 5,862,134 A | 1/1999 | Deng |
| 5,892,764 A * | 4/1999 | Riemann et al. ............. 370/401 |
| 6,345,071 B1 * | 2/2002 | Hamdi ........................ 375/222 |
| 6,370,149 B1 * | 4/2002 | Gorman et al. .............. 370/419 |
| 6,487,200 B1 * | 11/2002 | Fraser ......................... 370/389 |
| 6,580,704 B1 * | 6/2003 | Wellig et al. ................ 370/338 |

OTHER PUBLICATIONS

"System Description for the Cisco Communications Network", Version 2.1, Cisco Systems, Jan., 1999, 6 cover pages and pp. 1–36.

* cited by examiner

Primary Examiner—Chi Pham
Assistant Examiner—Thai Hoang
(74) Attorney, Agent, or Firm—Baker Botts L.L.P.

(57) ABSTRACT

A system (10) includes a network (12) of the type used to interconnect computers, and includes a plurality of telephone units (21–26) which are coupled to the network. These telephone units have sufficient embedded intelligence so that they can carry out all of their intended functionality as telephones. The system thus does not include a physically separate master control computer which is coupled to the network to serve as a call manager server or key system unit that treats the telephones as slaves. Each telephone has a manually operable device such as thumbwheels (108), which can be used to specify a unique number that forms part of the network address of the telephone and which also serves as the extension number for that telephone. One or more of the telephones can optionally be coupled to respective telephone lines (31–33) of a conventional public switching telephone network (36). Also, several computers (16–19) may optionally be coupled to the network, and communicate with each other through the network.

22 Claims, 5 Drawing Sheets

METHOD AND APPARATUS FOR NETWORK-BASED TELEPHONE COMMUNICATION WITHOUT A SEPARATE CALL MANAGER UNIT

TECHNICAL FIELD OF THE INVENTION

This invention relates in general to a private telephone system and, more particularly, to a network-based private telephone system in which communication between the telephones is effected by transmitting message units that contain digital information through the network.

BACKGROUND OF THE INVENTION

In a situation where several telephones are required, the traditional approach has been to install special wiring that serves as dedicated telephone wiring. In recent years, however, the use of computers has expanded, and the need for communication between computers has caused organizations to add an additional level of wiring, which is a network to interconnect the computers.

It has previously been recognized that it can be advantageous and cost-effective to use a single network of wiring to effect both telephone services and communication between computers. To this end, telephones have been developed which can be coupled to a traditional computer-type network, such as a network conforming to the industry standard commonly known as Ethernet. While these existing network-based telephone systems have been generally adequate for their intended purposes, they have not been satisfactory in all respects.

More specifically, these existing network-based telephone systems normally include several telephones which are coupled to the network, and an additional stand-alone computer which is also coupled to the network and which serves as a central controller. The central controller acts as a master, and treats the telephones as slaves. The system cannot operate without this central controller, which is commonly referred to as a call manager server or a Key System Unit (KSU). The central controller is particularly critical where the system is coupled to one or more telephone lines of a conventional telephone network, in order to permit any of the telephones in the system to place or receive calls using those telephone lines.

In comparison to the cost of the telephones, the central controller is a relatively expensive device. In fact, in a small system which involves only a few telephones, the cost of the central controller may be several times the combined cost of the telephones. As a result, such a small system may be far too expensive to be reasonably used in a home or a small business. A further consideration is that the administration of these existing systems requires special hardware and/or software tools, for example to move a given telephone or to change the number assigned to a given telephone. Use of these tools may necessitate a level of operator training or sophistication which makes these systems highly unattractive for use in a home or small business.

SUMMARY OF THE INVENTION

From the foregoing, it may be appreciated that a need has arisen for a method and apparatus for providing network-based telephone capability without the need for a central controller, and with simple and easy-to-learn provisions for routine system administration. According to the present invention, a method and apparatus are provided to address this need, and involve: providing a network through which can be transmitted message units that contain information in a digital format; coupling to the network a plurality of separate telephone units which are each usable by a person, and which have therein a control portion that is integral in its entirety to the telephone units and transmits message units through the network in order to effect communication between the telephone units; and causing the control portion to respond to a manual event at a first of the telephone units by selectively establishing audio communication between the first telephone unit and a second of the telephone units based on transmission of message units between the first and second telephone units.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
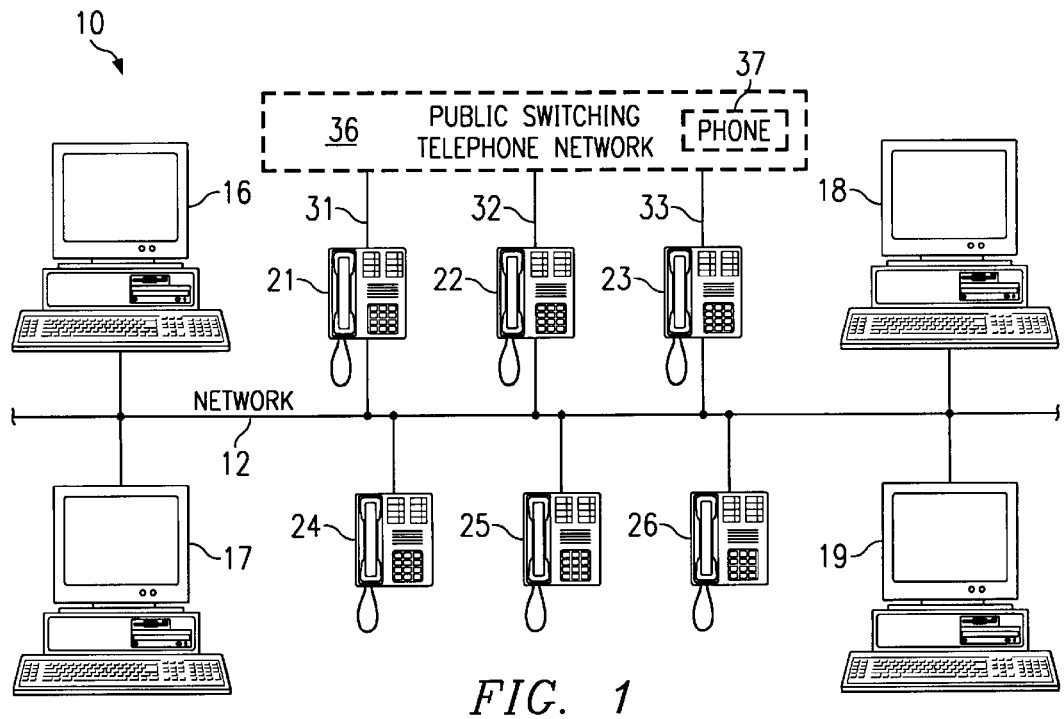
FIG. 1 is a block diagram of a system which embodies the present invention, and which includes a computer network, several computers and telephones that are coupled to and communicate across the computer network, and a separate telephone network having telephone lines which are coupled to some of the telephones.

FIG. 1 is a diagrammatic view of a system 10 which embodies the present invention. The system 10 includes a network 12 of a type used to transfer digital information between computers. In the disclosed embodiment, the network 12 conforms to a standard which is commonly known as an Ethernet network. However, other types of networks could alternatively be used.

The system 10 further includes several computers, four of which are shown at 16–19. In the disclosed embodiment, these computers are each a commercially available device of a type commonly known as a personal computer, but could alternatively be some other type of computer. Each of the computers 16–19 is coupled to the network 12, and the computers 16–19 can exchange information across the network 12 in a known manner. For purposes of the present invention, the computers 16–19 are optional, but are included in FIG. 1 in order to emphasize that, in addition to use for telephony according to the present invention, the network 12 can simultaneously be used for other compatible functions, such as facilitating communication between computers.

The system 10 further includes a plurality of telephones, six of which are shown at 21–26. The actual number of telephones in the system 10 could be more or less than six. In the disclosed embodiment, the telephones 21–26 are all structurally identical, and therefore only the telephone 21 is described in more detail later. Each of the telephones 21–26 is coupled to the network 12, and each of the telephones 21–26 can also be optionally coupled to a traditional dedicated telephone line. In this regard, in the exemplary embodiment of FIG. 1, the three telephones 21–23 are each coupled to a respective one of three traditional telephone lines 31–33, which are part of a public switching telephone network (PSTN) depicted diagrammatically at 36. In the disclosed embodiment, the telephone lines 31–33 are each a traditional dedicated telephone line of the analog type, but the invention encompasses other types of telephone lines. The PSTN 36 includes a plurality of telephones at remote locations, one of which is shown diagrammatically at 37.

Figure 2:
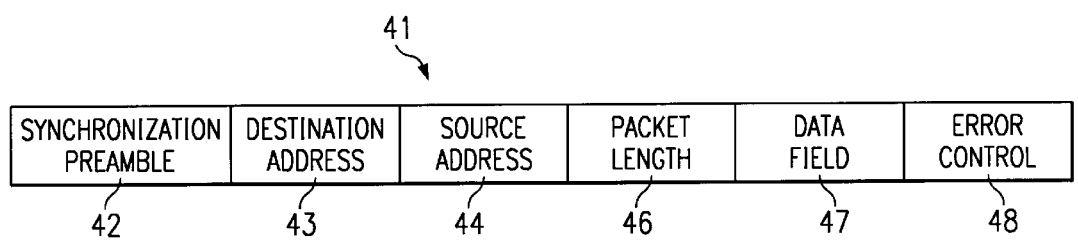
FIG. 2 is a diagrammatic view of the format of a standard Ethernet packet or message unit which is used in the embodiment of FIG. 1 to transmit information through the computer network.

Information is transferred across the Ethernet network 12 in the form of message units or packets. FIG. 2 is a diagrammatic view of the format of a single Ethernet packet 41, which is sometimes referred to as a frame. The format shown for packet 41 in FIG. 2 is an industry standard, and is therefore only briefly discussed here, to the extent necessary to facilitate an understanding of the present invention. In this regard, the packet 41 includes a synchronization preamble 42, an Ethernet destination address 43, an Ethernet source address 44, a packet length 46, a data field 47, and error control information 48. The source address 44 identifies the device which transmitted the packet 41 across the network 12, and the destination address 43 identifies the device to which the packet 41 is directed. The packet length 46 identifies the overall length of the packet 41, and the error control information 48 is used to detect and correct errors that may occur in the packet 41 during transmission.

The data field 47 may contain any type of information which the source device wishes to send to the destination device. In particular, it may be data, control information, or some other type of information. To the network 12, it is simply data, but to the source and destination devices, it may represent something other than data. For example, it may be control information, or a digital representation of a segment of audible sound.

Figure 3:
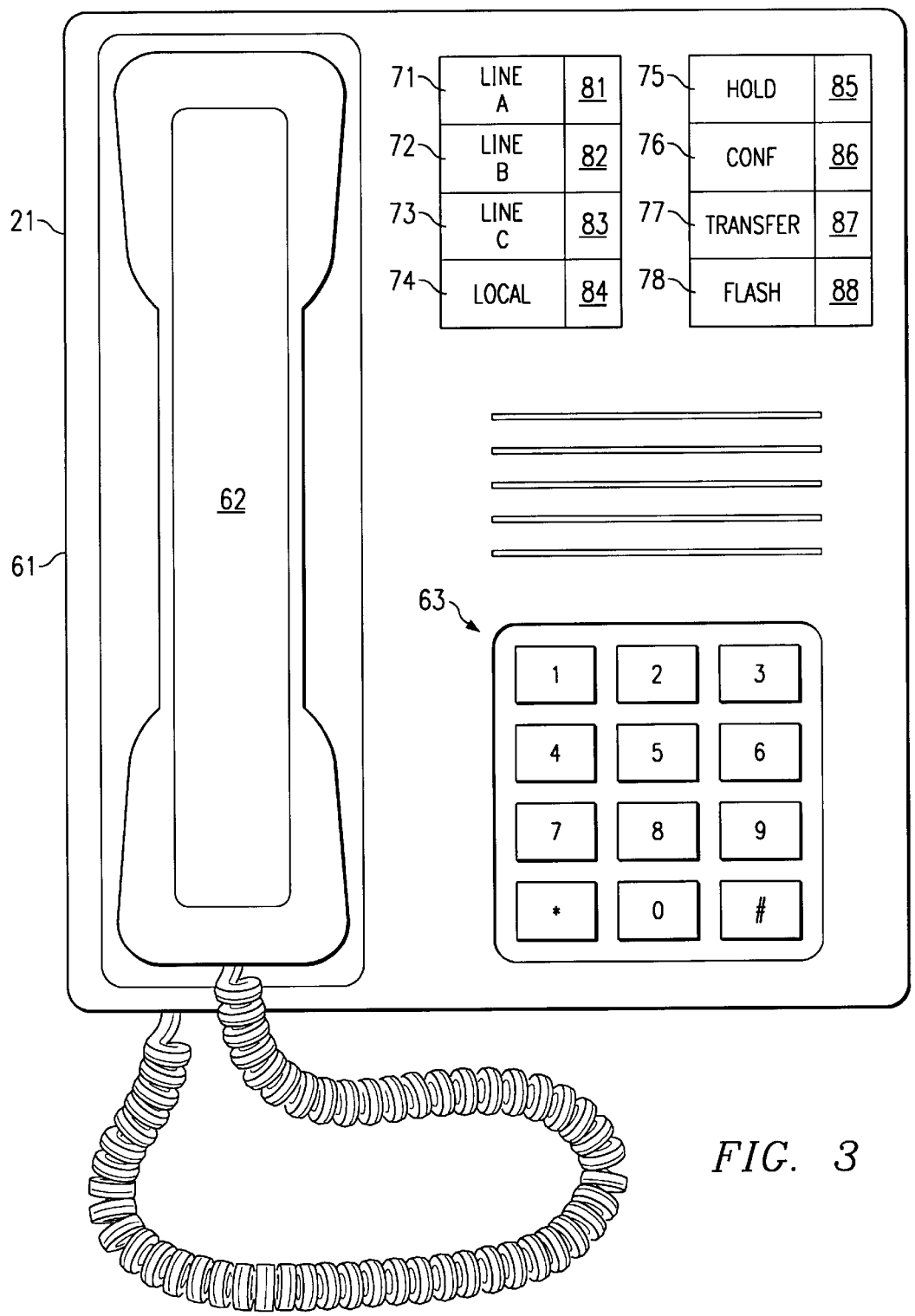
FIG. 3 is an enlarged view of one of the telephones in the system of FIG. 1.

FIG. 3 is an enlarged view of the telephone 21 of FIG. 1. The telephone 21 includes a housing 61, and a standard handset 62 which can be removably placed in a cradle provided in the housing 61. The telephone 21 includes a dialing keypad 63, which includes twelve push buttons arranged in the four-by-three array that is standard in the industry. Further, the telephone 21 includes an additional group of eight push buttons 71–78, each of which has adjacent to it a respective one of eight light emitting diodes (LEDs) 81–88. The three push buttons 71–73 are each used to select a respective dedicated telephone line, such as one of the three lines shown at 31–33 in FIG. 1. The push button 74 is used to select a local call, or in other words a call to another one of the telephones 22–26 which are on the same local network 12. The push buttons 75–78 are used to effect other standard telephone functions, such as hold, conference, transfer and flash. The push buttons 71–78 shown in FIG. 3 are exemplary in both number and function, and it will be recognized that the telephone could include a larger or smaller number of push buttons, representing a larger or smaller set of functions.

Figure 4:
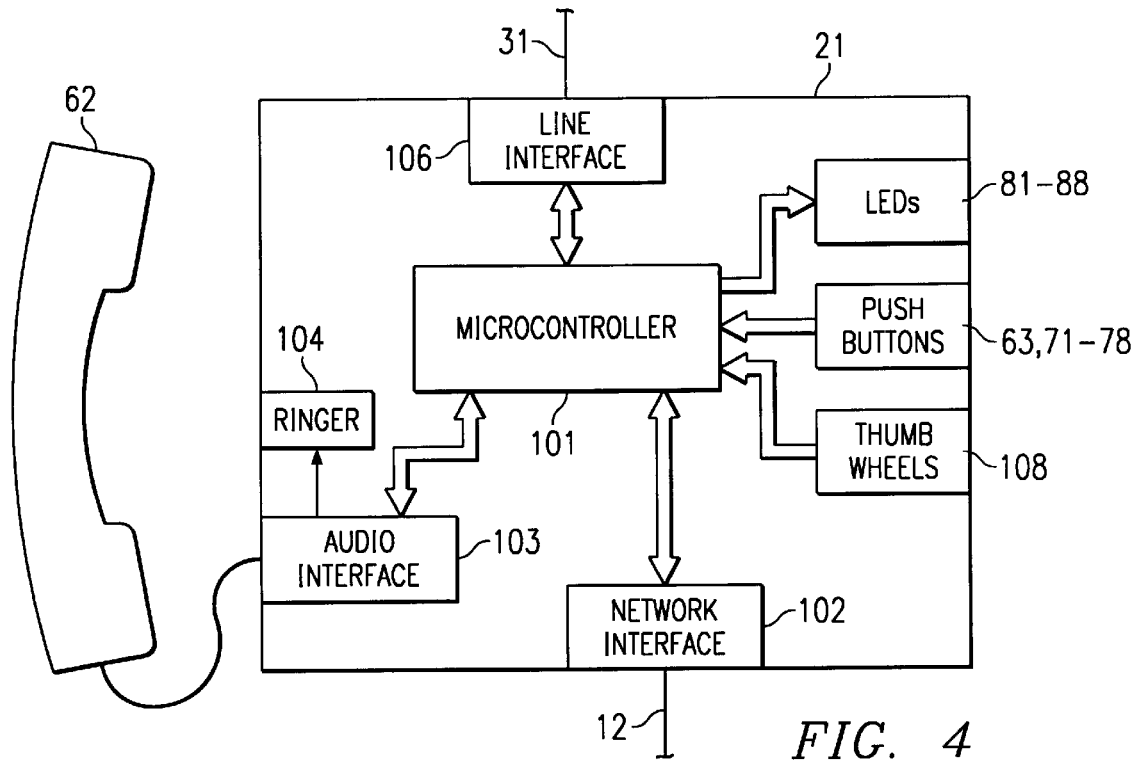
FIG. 4 is a diagrammatic view of circuitry within the telephone of FIG. 3.

FIG. 4 is a diagrammatic view of the circuitry within the telephone 21 of FIGS. 1 and 3. In particular, the telephone 21 includes a microcontroller 101, which is a commercially available device that includes a microprocessor, random access memory (RAM), and a read only memory (ROM). The ROM stores static data and the program executed by the microprocessor, and the RAM is used for variables, tables and other information that changes during the execution of the program. The telephone 21 further includes a network interface circuit 102, which interfaces the microcontroller 101 to the Ethernet network 12. The telephone 21 also includes an audio interface circuit 103, which interfaces the microcontroller 101 to the handset 62. In particular, analog signals from the microphone in the handset 62 are converted by the audio interface 103 into digital information, which is supplied to the microcontroller 101. The audio interface 103 also converts digital information provided by the microcontroller 101 into analog signals, which are supplied to the speaker in the earpiece of the handset 62 in order to produce audible sound. The telephone 21 also includes a ringer 104 which, in the disclosed embodiment, is driven by the audio interface 103 and can produce an audible sound under control of the microcontroller 101.

The telephone 21 also includes a line interface circuit 106, which interfaces the microcontroller 101 to the dedicated telephone line 31. In the disclosed embodiment, the line interface circuit 106 includes an industry standard RJ-11 jack (not illustrated) which cooperates with an industry standard RJ-11 plug (not illustrated) disposed at the end of the telephone line 31. However, the line interface circuit 106 and telephone line 31 could be operatively coupled to each other in some other manner. The microcontroller 101 is operatively coupled to each of the push buttons 63 and 71–78, and to each of the LEDs 81–88. The telephone 21 further includes two thumbwheels which are shown diagrammatically at 108, and which are coupled to an input port of the microcontroller 101. In the disclosed embodiment, the thumbwheels are provided on the underside of the telephone 26, and can each be set to select any digit from "0" to "9". Thus, the two thumbwheels 108 can together be used to manually specify any one of a hundred numbers from "00" to "99". The thumbwheels 108 are used to manually set the network address for each of the telephones 21–26.

More specifically, in the disclosed embodiment, the telephones 21–26 are each preconfigured to have a network address on the local network 12 such as "10.0.0.TT", where the letters "TT" represent the setting of the thumbwheels 108. Thus, all of the telephones on the network 12 will have a network address which is within the range from 10.0.0.00 to 10.0.0.99. This helps the telephones 21–26 on the network 12 identify each other, as discussed in more detail later. The setting of the thumbwheels 108 on each telephone also serves as the extension number of that particular telephone. The only significant requirement involved in setting the thumbwheels 108 is that each of the telephones 21–26 on the network 12 must have a thumbwheel setting which is different from the thumbwheel setting of every other telephone on the network.

It will be noted that the system 10 of FIG. 1 does not include a component which is usually found in pre-existing network telephone systems, namely a computer which is separate from the telephones, which is coupled to the network 12, and which acts as a call manager server or Key System Unit (KSU). While other types of digital telephone systems are inoperable without the presence of the separate call manager server or KSU, the system 10 according to the present invention has telephones 21–26 which are each designed to be capable of communicating with other as part of the telephone system without the need for a physically separate master unit such as a KSU or call manager server.

Figure 5:
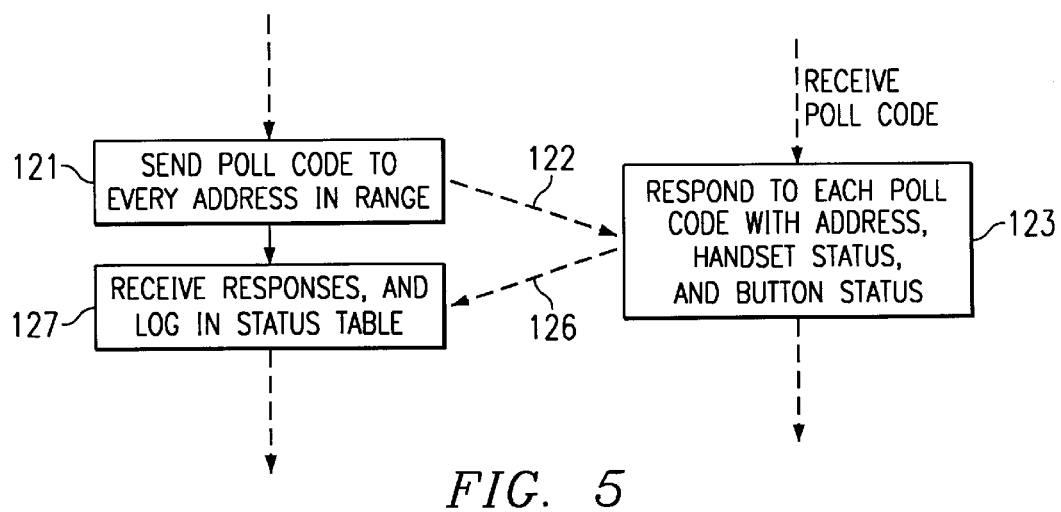
FIG. 5 is a flowchart showing diagrammatically how each telephone in the embodiment of FIG. 1 can identify other telephones on the computer network and obtain certain initial status information from them.

When each of the telephones 21–26 is first coupled to the network 12, one of the first things that it does is to identify all of the other telephones which are already coupled to the network 12, and obtain certain information from them. The following discussion explains in more detail how this occurs, with reference to FIG. 5. In this regard, assume for the sake of example that the telephone 26 of FIG. 1 has just been coupled to the network 12. FIG. 5 is a flowchart, in which the left side is a diagrammatic representation of certain events which occur in the telephone 26, and the right side is a diagrammatic representation of events which occur in each of the other telephones 21–25 that are already coupled to the network 12.

More specifically, after the telephone 26 is first coupled to the network 12, then at block 121 in FIG. 5 it automatically sends a packet of the type shown at 41 in FIG. 2 to all but one of the one hundred network addresses in the range from 10.0.0.00 to 10.0.0.99. The only network address to which the telephone 26 does not send a poll code is its own network address, as defined by its own thumbwheels 108. In each such transmitted packet 41, the data field 47 is a control code which polls the specified device for information. In the embodiment of FIG. 1, there are only five other telephones 21–25 currently coupled to the network 12. Thus, all but five of the ninety-nine packets transmitted at block 121 by the telephone 26 will be ignored. The other five will each be received by a respective one of the telephones 21–25, as shown diagrammatically by the arrow 122 in FIG. 5. Each of the telephones 21–25 will then separately respond, as shown at block 123 in FIG. 5.

In particular, since each such received packet 41 will include the network address (44 in FIG. 2) of the telephone 26, the telephones 21–25 are each capable of sending a respective packet directly back to the telephone 26. Specifically, each telephone sends back a packet which identifies its network address, as well as certain status information. The status information includes an indication of whether or not the handset 62 of that telephone is currently on-hook or off-hook (or in other words in or out of its cradle), an indication of which of the push buttons 71–74 on that telephone was most recently pressed, and an indication of whether that telephone is coupled to a telephone line (such as one of the lines 31–33). Each such packet is sent back across the network 12 directly to the telephone 26, as shown diagrammatically at 126 in FIG. 5.

At block 127 in FIG. 5, the telephone 26 takes this information and uses it to configure an internal status table, which contains an identification of every other telephone which is currently on the network, along with the current status information for each such telephone. Further, to the extent that some of the telephones 21–26 indicate to all other phones that they are coupled to the telephone lines 31–33, each of the telephones 21–26 maps each of the three push buttons 71–73 to a respective one of the telephone lines 31–33, using a common predetermined mapping technique. For example, the push buttons 71–73 may be assigned to the telephone lines 31–33 in a sequence corresponding to the ascending numerical order of the network addresses of the telephones 21–23 to which the lines 31–33 are coupled. In other words, the mapping would be determined by the setting of the thumbwheels 108 on each of the telephones 21–23 to which the telephone lines 31–33 are coupled. At the end of this procedure, each of the telephones 21–26 knows the local network addresses of all other telephones on the network 12, and can thereafter communicate directly with each of the other telephones. This is in contrast to network schemes of the type where a first device which wishes to communicate with a second device must first go to a third device that maintains a directory of network addresses, in order to obtain from the third device the network address of the second device.

In addition to this initialization procedure, the telephones 21–26 of the disclosed embodiment are each designed to transmit a "keep alive" message to every other phone at periodic intervals, such as every five minutes. This allows each telephone to detect a change in status of another phone, for example where the other is suddenly disconnected from the network.

Figure 6:
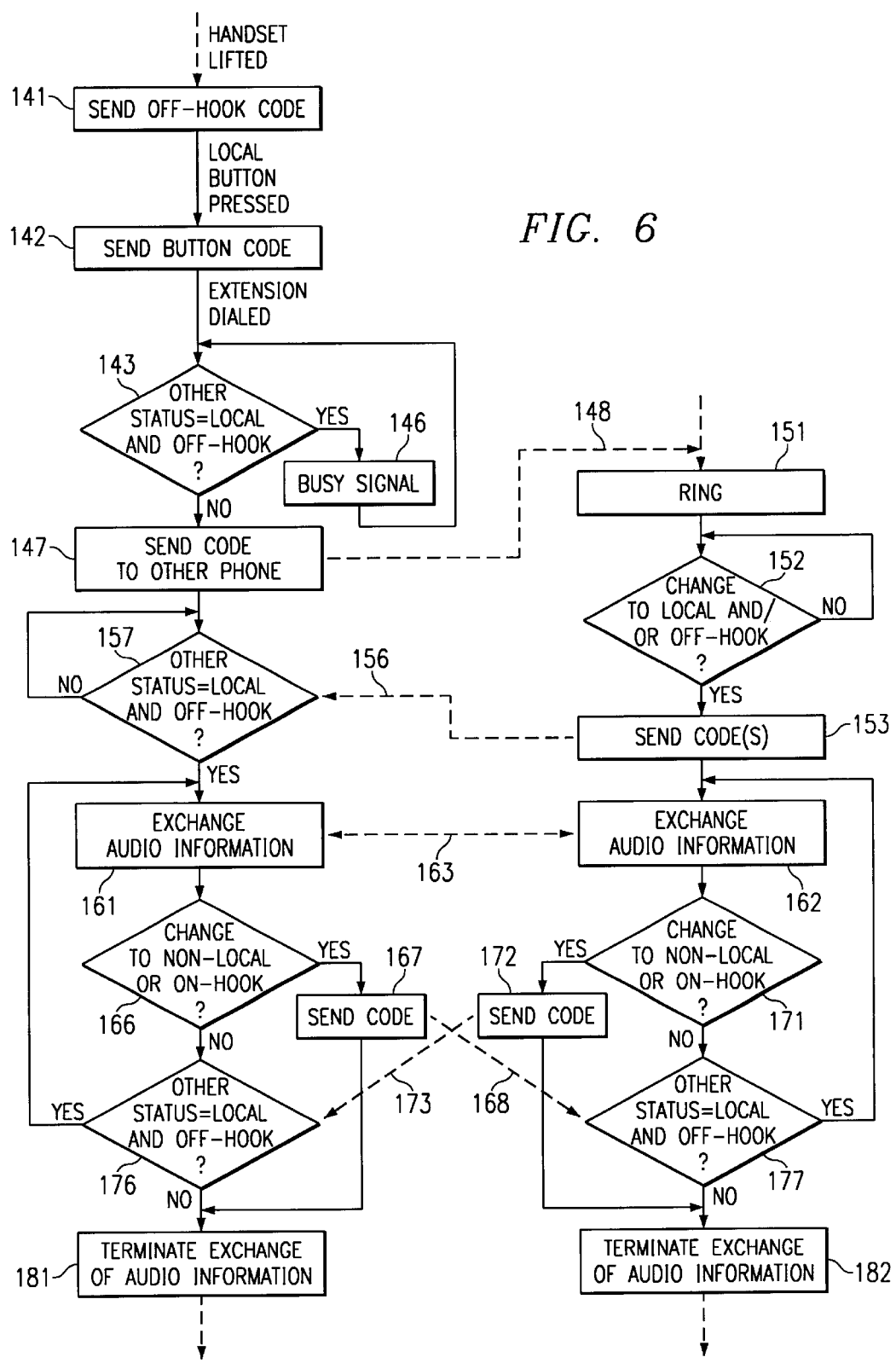
FIG. 6 is a flowchart showing diagrammatically how two telephones on the computer network of FIG. 1 can establish communication with each other.

In order to facilitate an understanding of the present invention, a brief explanation will now be given of how one of the telephones 21–26 could be used to place a call to another thereof. For purposes of this example, it will be assumed that the telephone 26 places a call to the telephone 21. FIG. 6 is a flowchart representing the sequence of events which occurs at each of the telephones 26 and 21 when this call is placed, where the left side of FIG. 6 represents events in the telephone 26, and the right side of FIG. 6 represents events in the telephone 21.

In order to initiate the call, a person would first lift the handset of the telephone 26, which at block 141 in FIG. 6 would cause the telephone 26 to transmit to each of the other telephones on the network 12 a respective packet containing a control code indicating that its handset has gone to an off-hook status. In this regard, the telephone 26 would know from its own status table that there are currently five other telephones 21–25 coupled to the network 12, and would thus transmit five packets which are identical except for the destination addresses 43 (FIG. 2). In response to these packets, each of the other telephones 21–25 will update its status table to reflect the fact that the handset of telephone 26 now has an off-hook status.

Next, the person would press the local push button 74 (FIG. 3) on the telephone 26 in order to indicate that a call will be made to one of the telephones 21–25 on the network 12, rather than to some remote telephone in the PSTN 36, such as the telephone shown at 37 in FIG. 1. The telephone 26 will turn on its LED 84 located adjacent the push button 74. Then, at block 142 in FIG. 6, the telephone 26 will send a respective packet to each of the other telephones 21–25, advising them that its local button 74 has been pressed. Each of the other telephones 21–25 will then update its internal status table so as to reflect that the telephone 26 is now configured for calls local to the network 12.

Next, the person at telephone 26 will use the dialing keypad 63 of the telephone 26 to dial the two-digit extension code for the telephone 21, which is the two-digit number defined by the setting of the two thumbwheels 108 on the telephone 21. At block 143 in FIG. 6, the telephone 26 will then consult its internal status table in order to determine whether the telephone 21 currently has its handset off-hook and its local button 74 pressed. If so, then the telephone 21 is presumably already involved in another call local to network 12, and therefore the telephone 26 will give its own caller a busy signal at block 146, without any need to have an exchange across the network 12 with the telephone 21.

On the other hand, if the telephone 26 determines at block 143 that the telephone 21 does not already appear to be involved in a local telephone call, then at block 147 the telephone 26 will send a packet directly to the telephone 21, as indicated diagrammatically by arrow 148 in FIG. 6. This packet includes a control code which instructs the telephone 21 to ring. Consequently, at block 151 in FIG. 6, the telephone 21 will produce an audible ringing sound, and will also cause its LED 84 (FIG. 3) to blink, to indicate that there is an incoming call which is local to the network 12. Then, at block 152, the telephone 21 checks to determine whether a person at the telephone 21 takes appropriate manual action to answer this incoming call, for example by lifting the handset 62 and/or by pressing the push button 74, as appropriate. If so, then at block 153 the telephone 21 sends directly back to the telephone 26 a packet indicating the change in status relative to its handset and/or push button 74, as indicated diagrammatically by arrow 156. The telephone 26 will respond to this packet by updating the information in its status table which relates to the status of telephone 21.

In the meantime, the telephone 26 has been periodically checking its status table, as shown at block 157, and will in due course detect the change to its status table which indicates that the telephone 21 has been answered. Control will then proceed from block 157 to block 161, where the telephone 26 will enter a mode in which it can exchange audio information with the telephone 21 across the network 12. In particular the telephone 26 takes audio information received from its handset 62 through its audio interface 103 and transmits it across the network 12 as a series of packets or message units such as that shown at 41 in FIG. 2. Also, the telephone 26 takes information from similar packets received across the network 12 from the telephone 21, and uses audio interface 103 to convert this information into audio signals which cause the speaker in the earpiece of its handset 62 to produce audible sound. At about the same time, the telephone 21 proceeds from block 153 to block 162, where it configures itself to exchange audio information in a similar manner. The exchange of audio information across the network 12 is represented diagrammatically by double-headed arrow 163 in FIG. 6.

While all this audio information is being exchanged, the telephones 21 and 26 each check for a manual act which would indicate an end to the telephone call. More specifically, at block 166, the telephone 26 checks to see whether the person using the telephone 26 has placed the handset 62 back in its cradle or has pushed one of the push buttons 71–73. If so, then the telephone 26 turns off its LED 84, and control proceeds from block 166 to block 167. In block 167, the telephone 26 sends to the telephone 21 a packet containing a control code identifying its change in status, as indicated diagrammatically by block 168. In the meantime, the telephone 21 is doing essentially the same thing at its own end of the call, as reflected by blocks 171 and 172, and arrow 173. If the telephone 26 does not detect any change in its own status at block 166, then it proceeds to block 176 where it checks its status table to determine whether there has been any change in the status of the telephone 21. In particular, if the telephone 21 had a status change which caused it to send at block 172 a packet containing a control code identifying a status change, the telephone 26 would receive the packet and update its status table, and then detect the change in the status table in its next periodic check of the status table at block 176. The telephone 26 would then proceed to block 181, where it would stop exchanging audio information.

In a parallel manner, if the telephone 21 does not detect a change in its own status at block 171, then at block 177 it checks for a change in status of the other telephone 26. In other words, if the telephone 26 had detected a change in its own status which caused it to send a packet at block 167 to identify this status change, the telephone 21 would receive the packet and update its status table, and then detect this status change in its next periodic check of the status table at block 177. The absence of such a status change would cause control to return to block 162. However, detection of such a status change would cause control to proceed to block 182, where the telephone 21 would stop exchanging audio information. It will be noted that, if either of the telephones 26 and 21 detects a change in its own status and sends a packet at block 167 or block 172, it will proceed directly to block 181 or block 182, respectively, in order to end the exchange of audio information. It will thus be noted that the telephones 21 and 26 have therein all of the control intelligence needed to establish, maintain and end a telephone call between them across the network 12, without any need for a physically separate master control computer such as a call manager server or KSU.

A brief explanation will also now be given of how one of the telephones 21–26 can place a telephone call across one of the telephone lines 31–33 to a remote telephone in the PSTN 36, such as the telephone 37. It should be relatively self-evident how the telephone 21 could place such a telephone call through the telephone line 31 to which it is directly coupled. However, the embodiment of FIG. 1 is more sophisticated than this. In particular, each of the telephones 21–26 is capable of placing or receiving a call on any one of the lines 31–33 of the PSTN 36. In fact, the telephone 26 could place a call on the line 33 which is coupled to the telephone 23, and during this call the telephone 23 could place a call on the line 31 coupled to telephone 21. In order to facilitate an understanding of how this capability is implemented, a specific example will be helpful. Therefore, the following discussion explains how telephone 26 can place a call through telephone 21 and line 31 to the telephone 37 in the PSTN 36.

Figure 7:
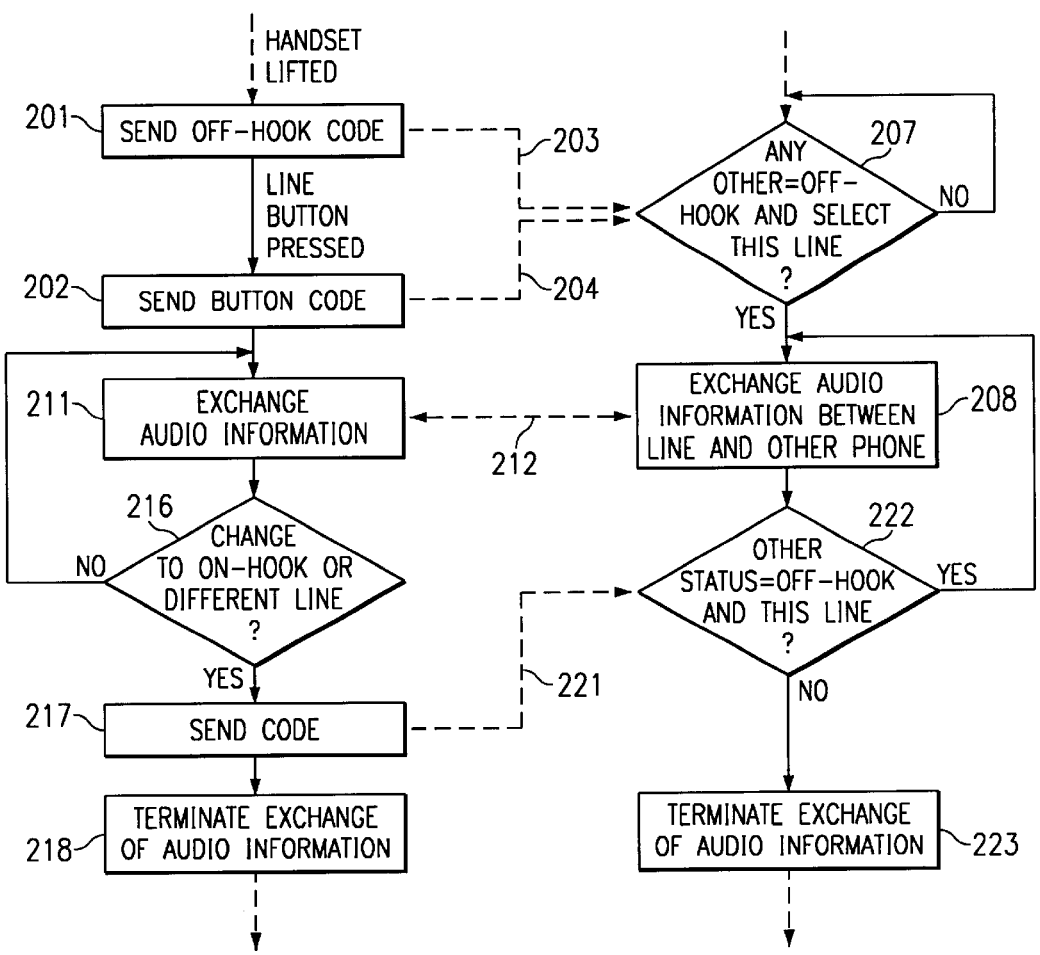
FIG. 7 is a flowchart showing diagrammatically how a telephone coupled to the computer network of FIG. 1 can establish communication through one of the telephone lines with a remote telephone in the public telephone network.

More specifically, FIG. 7 is a flowchart diagrammatically showing the sequence of operations which occurs in each of the telephones 26 and 21, the left side of FIG. 7 corresponding to the telephone 26 and the right side of FIG. 7 corresponding to the telephone 21. A person using telephone 26 may initiate the call by lifting the handset of telephone 26, which at block 201 in FIG. 7 causes the telephone 26 to send to each of the other telephones 21–25 a respective packet indicating a change in the status of its handset, in that the handset now has an off-hook status. Each of the telephones 21–25 would receive the respective packet sent to it, and then update its status table.

Next, the person using telephone 26 would press the push button 71 (FIG. 3) to indicate that the telephone 26 should be operatively coupled to the corresponding one of the telephone lines 31–33. The telephone 26 would turn on its LED 81 which is adjacent the pushbutton 71. As discussed above, the system has configured itself to associate telephone line 31 with push button 71. As soon as the push button 71 is pressed, then at block 202 in FIG. 7 the telephone 26 will send to each of the other telephones 21–25 a respective packet indicating that its push button 71 has been pressed. Each of the telephones 21–25, upon receiving a respective one of these packets, will update its status table to reflect the status change at the telephone 26. Further, each will turn on its own LED 81, in order to indicate that at least one of the telephones 21–16 is involved in an ongoing telephone call on the telephone line 31. The transmission of the packets at blocks 201 and 202 is represented diagrammatically by the arrows 203 and 204 in FIG. 7.

In the meantime, telephone 21 knows that it is coupled to and responsible for telephone line 31, and telephone 21 therefore monitors its status table to determine whether any other telephone has a status indicating it wants to be coupled to line 31. This is represented in FIG. 7 by block 207. When the telephone 21 detects from its status table at block 207 that the telephone 26 wishes to be coupled to the telephone line 31, the telephone 21 will proceed from block 207 to block 208, where it will arrange to exchange audio information between the telephone line 31 and the telephone 26 through network 12. Meanwhile, the telephone 26 will have proceeded from block 202 to block 211, where it will facilitate an exchange of audio information between its handset and the network. This exchange of audio information is represented diagrammatically by arrow 212.

In the disclosed embodiment, this exchange of audio information includes the transmission of audio sounds by the telephone 26 in order to effect dialing of a telephone number, in particular by using the dual-tone dialing technique which is standard in the industry. The exchange of audio information also includes other standard audio telephony information such as dial tones, busy signals, ringing sounds, voices, and so forth. The exchange of audio information will continue while the call is being placed, and thereafter if the telephone 37 is answered by a person. It should be noted that, although the telephone 21 is transmitting information for this call between the network 12 and the telephone line 31, this does not prevent a person from using telephone 21 to place a call, either to another one of the telephones 22–25 on the network 12, or through one of the available telephone lines 32 and 33 to a remote telephone in the PSTN 36, such as the telephone 37.

While the telephone 26 is involved in this exchange of audio information at block 211, it is also checking at block 216 for a change in its own status that would indicate the person using telephone 26 is ending the call. For example, the person may replace the handset in its cradle, or press one of the push buttons 72–74. If the telephone 26 detects such a change in its own status, then the telephone 26 turns off its LED 81 to indicate that the call has ended. Control proceeds to block 217, where telephone 26 sends to each of the other telephones 21–25 a respective packet identifying the change in status at telephone 26. Telephone 26 then proceeds to block 218, where it ends the exchange of audio information. With respect to the packets sent at block 217, which are represented diagrammatically by arrow 221, each of the other telephones will receive one of the packets and then update its internal status table. Further, each will turn off its own LED 81 to indicate that the call on line 31 has ended, and that line 31 is thus available for another call. At block 222 in FIG. 7, the telephone 21 is periodically checking for such a change in the status of the telephone 26, because it knows that this will indicate an end to the call in progress. When a periodic check of its status table at block 222 reveals that the other telephone 26 has had such a status change, control proceeds from block 222 to block 223, where the telephone 21 terminates the exchange of audio information between telephone 26 and telephone line 31 through network 12.

A very brief explanation will now be given of how the system 10 could receive a telephone call from the remote telephone 37 through telephone line 31. Assume that a person at telephone 37 dials a telephone number associated with telephone line 31, in response to which the telephone 21 will detect that there in an incoming call on telephone line 31. The telephone 21 will then cause itself to produce a ringing sound, and will also blink the LED81 associated with the line 31. Moreover, the telephone 21 will send to each of the other telephones 22–26 a respective packet instructing these telephones to ring, and each of these telephones will also ring and blink their respective LED81. If a person at any one of the telephones 21–26 wishes to answer this call, he or she will take appropriate action such as lifting the handset and/or pressing the push button adjacent the blinking LED, such as the push button 71. This will cause that particular telephone to then send to each of the other telephones a respective packet indicating its change in status, which the other telephones will use to update their external status table. In the case of telephone 21, telephone 21 will also detect from the change in its status table which of the other telephones is answering the call. At this point, the telephone 21 and the other telephone arrange to exchange audio information in an appropriate manner similar to that described above in association with FIG. 7, thereby effectively answering the call placed from telephone 37, and allowing the call to proceed. The termination of the call can be detected and implemented in manner similar to that described above in association with FIG. 7.

The present invention provides a number of technical advantages. One such technical advantage is that most small offices and other organizations have a computer network in place, and the telephones according to the present invention are designed to be coupled directly to this network rather than to dedicated telephone wiring. Consequently, no added wiring is required for use of the present invention, because both the computers and the telephones share a common network. Further, the network address for each telephone is manually set in an easy-to-understand manner using a device such a thumbwheel, and the telephones are each designed to automatically discover all other telephones on the network and to automatically configure themselves relative to these other telephones. Thus, there is no need for a highly-trained system administrator to carry out tasks such as moving telephones, changing extension numbers, and so forth. A telephone with a given extension number can be connected to the network at any point, and can be moved by disconnecting it and then reconnecting it at a different point. The extension number can be changed by simply changing the setting of the thumbwheels.

A further advantage results from the fact that the present telephone system does not require a physically separate computer to serve as a central controller, namely a controller of the type commonly referred to as call manager server or a Key System Unit (KSU). In a very small phone system, the cost of the central controller is significant in relation to the cost of the telephones themselves. In the system according to the invention, the telephones have a cost comparable to that of telephones in known systems, but the cost of the central controller is eliminated, thereby permitting a small telephone system to be implemented at a substantially lower cost than with an existing system that requires a central controller.

Still another advantage is the fact that the system according to the present invention can be easily scaled by simply purchasing additional phones. Thus, as a small business grows, the phone system can grow with it, without any need to replace or upgrade a central controller, and without any need for a highly-trained system administrator to reconfigure the central controller. Another advantage is that one or more of the telephones in the system each can also be coupled to a traditional dedicated telephone line, and every telephone in the system then has the capability to make or receive a telephone call using that telephone line.

Although one embodiment has been illustrated and described in detail, it should be understood that various substitutions and alterations can be made therein without departing from the scope of the present invention. For example, the disclosed embodiment uses a computer network which conforms to the Ethernet standard, but it will be recognized that other types of networks could also be used.

As another example, the disclosed embodiment has telephones with an exemplary configuration of push buttons and LEDs, but it will be recognized that a wide variety of other configurations could be provided. Yet another example is that the disclosed embodiment uses thumbwheels on each telephone to set the network address and extension number for that telephone, but it will be recognized that there are other ways in which this information could be specified, for example by pressing a special sequence of push buttons on the telephone.

The disclosed telephone does not have an alpha/numeric display, but it will be recognized that an alpha/numeric display could be provided, and could for example be used to implement a caller identification ("caller ID") function. Moreover, the explanation of the disclosed embodiment includes specific examples of the handshaking which can occur between telephones in the system for purposes such as discovering what telephones are in the system and placing calls between the telephones. However, it will be recognized that there are variations of the disclosed handshaking which fall within the present invention. In addition, certain capabilities of the telephones in the disclosed embodiment have been described in order to facilitate an understanding of the present invention, but it will be recognized that these telephones may have additional capabilities, including but not limited to transfer, hold, conference, and drop capabilities.

Other substitutions and alterations are also possible without departing from the spirit and scope of the present invention, as defined by the following claims.

What is claimed is:

1. An apparatus, comprising:
   a network through which can be transmitted message units containing information in a digital format;
   a plurality of separate telephone units which are each coupled to said network, which are each usable by a person, and which communicate with each other by transmitting message units through said network; and
   a control portion which is integral in its entirety to said telephone units, and which in response to a manual event at a first of said telephone units is operative to selectively establish audio communication between said first telephone unit and a second of said telephone units by transmitting message units between said first and second telephone units through said network;
   wherein said control portion is operative to cause each of said telephone units to use message units transmitted through said network to automatically identify every other said telephone unit coupled to said network, and to obtain from every other said telephone unit a respective unique network address thereof.

2. An apparatus according to claim 1, wherein said second telephone unit is coupled to a telephone line of a telephone system, and wherein said control portion is operative to facilitate communication through said network between said telephone line and one of said telephone units other than said second telephone unit.

3. An apparatus according to claim 1, wherein said second telephone unit is coupled to a telephone line of a telephone system, and wherein said control portion is operative to facilitate communication through said network between said telephone line and a third of said telephone units, and to facilitate communication through said network between said first and second telephone units while said third telephone unit is in communication with said telephone line.

4. An apparatus according to claim 1, including first and second computers which are coupled to said network and which communicate with each other by transmitting message units through said network.

5. An apparatus according to claim 1, wherein said message units conform to an Internet protocol (IP) communication standard.

6. An apparatus according to claim 1, wherein each of said telephone units is operable to permit a network address therefor to be specified manually.

7. An apparatus according to claim 6, wherein an extension number for each of said telephone units is a function of the manually specified network address.

8. An apparatus according to claim 1, wherein each said telephone unit responds to a predetermined manual operation thereof by transmitting to every other said telephone unit a message unit which identifies the occurrence of said predetermined manual operation.

9. A method, comprising the steps of:
   providing a network through which can be transmitted message units that contain information in a digital format;
   coupling to said network a plurality of separate telephone units which are each usable by a person, and which have therein a control portion that is integral in its entirety to said telephone units, and that transmits message units through said network in order to effect communication between said telephone units;
   causing said control portion to respond to a manual event at a first of said telephone units by selectively establishing audio communication between said first telephone unit and a second of said telephone units using message units transmitted between said first and second telephone units through said network; and
   causing each of said telephone units under control of said control portion to transmit message units through said network in order to automatically identify every other said telephone unit coupled to said network and in order to obtain from every other said telephone unit a respective unique network address thereof.

10. A method according to claim 9, including the steps of coupling a telephone line to said second telephone unit, and causing said control portion to facilitate communication through said network between said telephone line and one of said telephone units other than said second telephone unit.

11. A method according to claim 9, including the step of coupling a telephone line to said second telephone unit, and causing said control portion to facilitate communication through said network between said telephone line and a third of said telephone units, and to facilitate communication through said network between said first and second telephone units while said third telephone unit is in communication with said telephone line.

12. A method according to claim 9, including the steps of coupling first and second computers to said network, and effecting communication between said computers by transmitting message units through said network.

13. A method according to claim 9, including the step of manually specifying for each of said telephone units a respective unique network address.

14. A method according to claim 13, including the step of using as an extension number for each of said telephone units a number based on the manually specified network address.

15. A method according to claim 9, including the step of causing each of said telephone units to respond to a predetermined manual operation thereof by transmitting to every other said telephone unit a message unit which identifies the occurrence of said predetermined manual operation.

16. An apparatus, comprising: first and second telephone units which are each usable by a person and which each include a network interface portion that can be operatively coupled to a network and that can transmit and receive network message units containing information in a digital format, said first and second telephone units including a control portion which is integral in its entirety to said first and second telephone units, and which in response to a manual event at one of said first and second telephone units is operable to selectively establish audio communication between said first and second telephone units by causing said network interface portions thereof to transmit network message units between said first and second telephone units;

wherein said second telephone unit has a line interface portion that can be operatively coupled to a telephone line of a telephone system, and wherein said second telephone unit is operable under control of said control portion to facilitate communication between said line interface portion thereof and said network interface portion thereof by converting audio information received in a predetermined form through said line interface portion thereof into network message units to be transmitted through said network interface portion thereof, and by converting audio information received through said network interface portion thereof in the form of network message units into the predetermined form to be transmitted through said line interface portion thereof.

17. An apparatus according to claim 16, wherein said second telephone unit has an audio user interface portion and is further operable under control of said control portion to facilitate communication between said network interface portion thereof and said audio interface portion thereof while facilitating said communication between said line interface portion thereof and said network interface portion thereof, by converting audio information received through said audio interface portion thereof into network message units to be transmitted through said network interface portion thereof, and by converting audio information received in network message units through said network interface portion thereof into a form to be supplied to said audio user interface portion thereof.

18. An apparatus according to claim 16, wherein said network message units conform to an Internet protocol (IP) communication standard.

19. An apparatus according to claim 16, wherein each said telephone unit is operable under control of said control portion to permit a network address thereof to be manually specified.

20. An apparatus according to claim 19, wherein each said telephone unit is operable under control of said control portion to have an extension number which is a function of the manually specified network address thereof.

21. An apparatus according to claim 16, wherein each said telephone unit is operable under control of said control portion to respond to a predetermined manual operation by transmitting through said network interface portion thereof at least one network message unit which identifies the predetermined manual operation.

22. An apparatus, comprising: first and second telephone units which are each usable by a person and which each include a network interface portion that can be operatively coupled to a network and that can transmit and receive network message units containing information in a digital format, said first and second telephone units including a control portion which is integral in its entirety to said first and second telephone units, and which in response to a manual event at one of said first and second telephone units is operable to selectively establish audio communication between said first and second telephone units by causing said network interface portions thereof to transmit network message units between said first and second telephone units;

wherein each said telephone unit is operable under control of said control portion to transmit through said network interface portion thereof a polling network message unit that polls for the presence of at least one other telephone unit, and to respond to receipt of a polling network message unit through said network interface portion thereof by transmitting through said network interface portion thereof at least one network message unit which includes a unique network address thereof.

\* \* \* \* \*